United States Patent
Grossman et al.

(10) Patent No.: US 9,826,024 B2
(45) Date of Patent: Nov. 21, 2017

(54) SERVER SIDE VIDEO SCREEN CAPTURE

(71) Applicant: AUTODESK, INC., San Rafael, CA (US)

(72) Inventors: Tovi Grossman, Toronto (CA); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 590 days.

(21) Appl. No.: 13/871,628

(22) Filed: Apr. 26, 2013

(65) Prior Publication Data

US 2014/0297715 A1 Oct. 2, 2014

Related U.S. Application Data

(60) Provisional application No. 61/807,274, filed on Apr. 1, 2013.

(51) Int. Cl.
*G06F 15/16* (2006.01)
*H04L 29/08* (2006.01)

(52) U.S. Cl.
CPC .................................. *H04L 67/10* (2013.01)

(58) Field of Classification Search
CPC ... H04L 12/1831; H04L 67/025; H04N 5/225; G06F 17/30
USPC ........................ 709/224, 208, 204
See application file for complete search history.

(56) References Cited

U.S. PATENT DOCUMENTS

| | | | | |
|---|---|---|---|---|
| 8,984,350 | B1* | 3/2015 | Weng ................. | G06F 11/2048 707/610 |
| 9,087,024 | B1* | 7/2015 | Hayden ................. | G10L 25/30 |
| 2004/0222995 | A1* | 11/2004 | Colle ....................... | G09G 5/36 345/545 |
| 2006/0101422 | A1* | 5/2006 | Bourges-Waldegg .. | G06F 9/548 717/136 |
| 2006/0284981 | A1* | 12/2006 | Erol ................... | G06F 17/30244 348/207.1 |
| 2010/0174992 | A1* | 7/2010 | Portman ............... | G06F 9/4443 715/738 |
| 2013/0159822 | A1* | 6/2013 | Grossman et al. ........... | 715/201 |
| 2013/0282560 | A1* | 10/2013 | Rapatz ................... | G06Q 20/22 705/39 |
| 2014/0095600 | A1* | 4/2014 | Needham ............... | H04L 67/38 709/204 |

* cited by examiner

*Primary Examiner* — Bryan Lee
(74) *Attorney, Agent, or Firm* — Artegis Law Group, LLP (57) ABSTRACT

A technique for capturing the output of a software application, controlled by an end-user of a client computer, on a server computer. The data may be captured from a hosted application running on the server computer, an application simulating the operations of an application used by the end-user on the client computer, or from a capture stream sent by an application on the client computer. A capture engine stores the capture data on the server computer without consuming processing or memory resources of the client computer. Furthermore, the capture data is immediately available on the server computer for sharing and publication, without consuming network bandwidth or a long upload delay.

21 Claims, 7 Drawing Sheets

SERVER SIDE VIDEO SCREEN CAPTURE

CROSS-REFERENCE TO RELATED APPLICATIONS

This application claims benefit of U.S. provisional patent application Ser. No. 61/807,274, filed Apr. 1, 2013. The entire contents of the foregoing application is hereby incorporated herein by reference.

BACKGROUND OF THE INVENTION

Field of the Invention

Embodiments of the invention generally relate to video screen capture and, more specifically, to techniques for providing a server-side video screen capture.

Description of the Related Art

There is a growing desire to capture the output generated as software applications run. One of the most popular forms of output to capture is the video data produced by an application for display to an end-user. The video data can be used to demonstrate features of the software application. The use of such video data to demonstrate features of software applications has become commonplace in the software industry. A video clip provides details that would be difficult to convey in written instructions alone. For instance, an end-user could create a video tutorial to share a difficult red-eye reduction technique in a photo-editing software application. The technique could involve some intriguing steps that are hard to describe without a visual demonstration. The video clip would show the video data of the photo editing software as the end-user demonstrates exactly how to perform the red-eye reduction technique.

Typically, a video capture application captures the video data of the target application. The video capture application reads and stores the video frames from the video buffers of the target application while running alongside the target application on the desktop computer of the end-user. The video capture application stores the video data as a video clip on the desktop computer. If the end-user wants to share or publish the video clip, the end-user typically uploads the video clip to an online server for storage and publication.

Although these video capture applications can create the video clip, these applications typically consume significant processing resources. The consumption of processing resources can affect the performance of the desktop computer detrimentally. Furthermore, a typical video clip file may be very large, which may consume a significant amount of storage space on the desktop computer. The consumption of storage space may prove especially problematic if the desktop computer runs out of storage space. Running out of storage space may jeopardize the integrity of the video capture as well as applications and data on the desktop computer. Further, if the end-user uploads the video clip, the upload process could consume a significant amount of network bandwidth and take a long time. The bandwidth consumption could affect the network performance and the long upload time could delay the sharing or publication of the video clip.

As the foregoing illustrates, what is needed in the art are application output capture systems that use less of the computer and network resources available to an end-user.

SUMMARY OF THE INVENTION

One embodiment of the present invention sets forth a computer-implemented method for publishing information that reflects the operation of a software application. The method includes receiving input data from a first software application executing on a first computing device, causing a second software application executing on a second computing device to generate output data in response to the input data, generating a capture sequence that includes at least a portion of the output data and reflects the operation of the second software application, and publishing the capture sequence for access via a network.

Other embodiments of the present invention include, without limitation, a computer-readable storage medium including instructions that, when executed by a processing unit, cause the processing unit to implement aspects of the approach described herein as well as a system that includes different elements configured to implement aspects of the approach described herein.

One advantage of the disclosed technique is that the capture data, such as a video clip, is generated from the output of the application without consuming processing or memory resources of the client computer operated by the end-user. Additionally, the capture data is immediately available on the server computer for sharing and publication.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
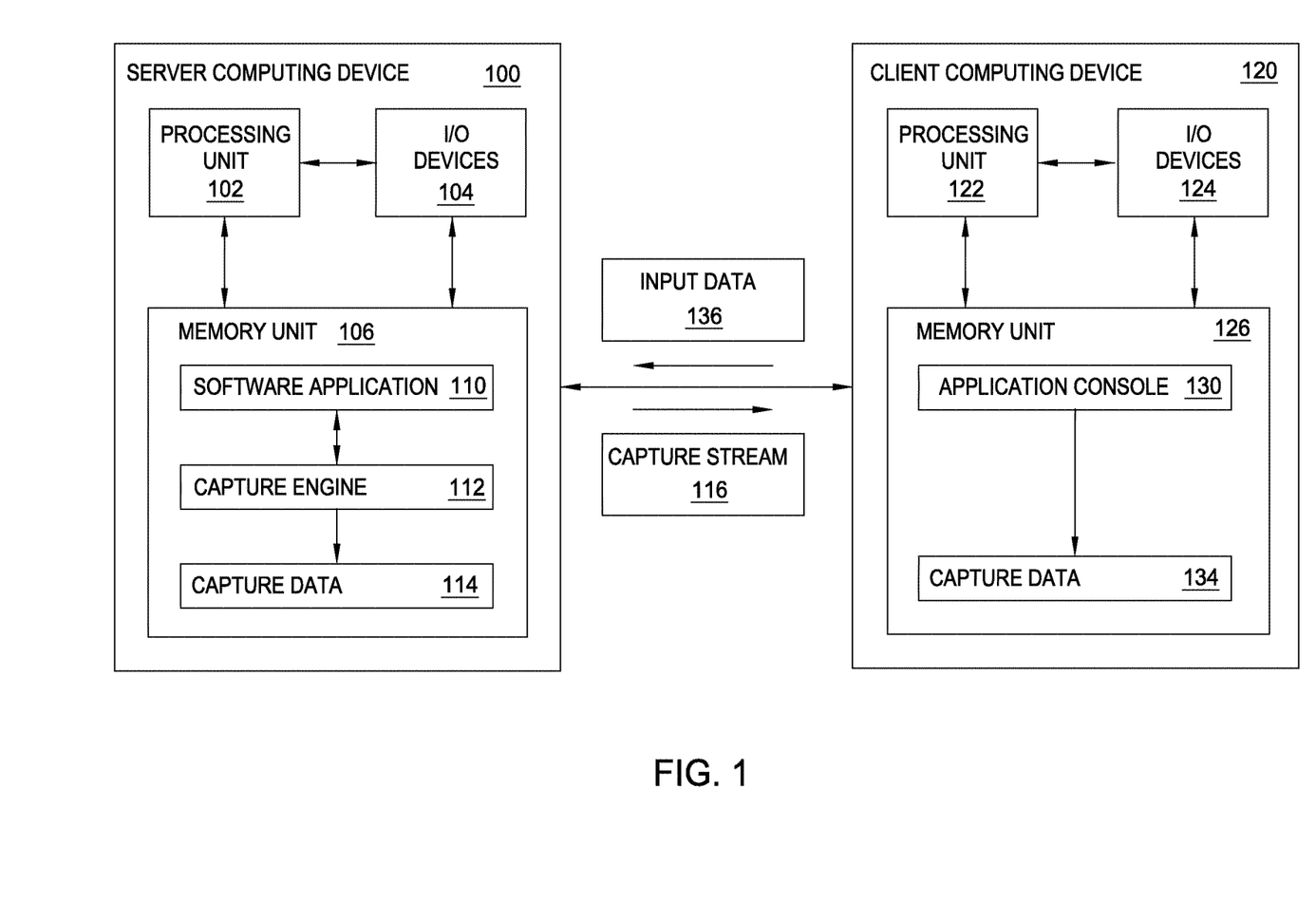
FIG. 1 illustrates a server computing device coupled to a client computing device, according to one embodiment of the present invention.

FIG. 1 illustrates a server computing device 100 coupled to a client computing device 120, according to one embodiment of the present invention. The server computing devices 100 and the client computing device 120 may be coupled together via a network connection, such as, e.g. the Internet, wireless connection, a physical connection, or any other type of data connection.

As shown, the server computing device 100 includes a processing unit 102, input/output (I/O) devices 104, and a memory unit 106. The processing unit 102 may be a central processing unit (CPU), a graphics processing unit (GPU), or a combination of different processing units, such as a CPU configured to operate in conjunction with a GPU. In general, the processing unit 102 may be any technically feasible unit capable of processing data and/or executing software applications. Further, in the context of this disclosure, the computing elements shown in the server computing device 100 may correspond to a physical computing system (e.g., a system in a data center) or may be a virtual computing instance executing within a computing cloud.

The I/O devices 104 may include devices capable of receiving input, such as a keyboard, a mouse, a microphone, and so forth, as well as devices capable of providing output, such as a display device, a speaker, and so forth. Additionally, I/O devices 104 may include devices capable of both receiving input and providing output, such as a touch screen, a universal serial bus (USB) port, and so forth. I/O devices 104 may be configured to receive various types of input from an end-user of the server computing device 100, directly or via a remote interface and to provide various types of output to the end-user of server computing device 100 directly or via a remote interface.

The memory unit 106 may include a random access memory (RAM) module, a flash memory unit, disk drive storage device, or any other type of memory unit or combination thereof. Processing unit 102 is configured to read data from and write data to the memory unit 106. Although shown as a single unit, the memory unit 106 may be a combination of fixed and/or removable storage devices, such as fixed disc drives, removable memory cards, or optical storage, network attached storage (NAS), or a storage area-network (SAN). Memory unit 106 includes software application 110, capture engine 112, and capture data 114, described in greater detail below.

The client computing device 120 includes similar components as server computing device 100. As shown, the client computing device 120 includes a processing unit 122, I/O devices 124, and a memory unit 126. The processing unit 122 may be a CPU, a GPU or a combination of different processing units, such as a CPU configured to operate in conjunction with a GPU. In general, the processing unit 122 may be similar to the processing unit 102 within the server computing device 100 and may thus be any technically feasible unit capable of processing data and/or executing software applications, including physical computing systems as well as virtual instances of computing systems.

The I/O devices 124 may include devices capable of receiving input, such as a keyboard, a mouse, a video camera, a microphone, and so forth, as well as devices capable of providing output, such as a display device, a speaker, and so forth. Additionally, I/O devices 124 may include devices capable of both receiving input and providing output, such as a touch screen, a USB port, and so forth. I/O devices 124 may be configured to receive various types of input from an end-user of the client computing device 120, and to provide various types of output to the end-user of the client computing device 120. The I/O devices 124 may be similar to the I/O devices 104.

The memory unit 126 may include a random access memory (RAM) module, a flash memory unit, disk drive storage device, or any other type of memory unit or combination thereof. Processing unit 122 is configured to read data from and write data to the memory unit 126. Similar to memory unit 106 within server computing device 100, the memory unit 126 may be a combination of fixed and/or removable storage devices, such as fixed disc drives, removable memory cards, or optical storage, NAS, or SAN. The memory unit 126 includes the application console 130 and capture data 134.

The application console 130 is a software application that, when executed by processing unit 122, allows the end-user of the client computing device 120 to interact with the software application 110 within the server computing device 100. The application console 130 is configured to receive commands from the end-user and to transmit those commands, along with other input received from the end-user, to the software application 110 as input data 136.

The software application 110 may then perform various operations in response to input data 136 and generate various types of output based on that input data. The output of software application 110 may include video frames that display the operation of software application 110 and/or audio data, among other types of output. Capture engine 112 within server computing device 100 is configured to capture the output of software application 110 and transmit capture stream 116 to the client computing device 120 that represents that output.

Application console 130 is configured to receive the capture stream 116 from the software application 110 and then derive the capture data 134 from the capture stream 116 representing the output of the software application 110. The application console 130 may then display that capture data 134 to the end-user. The capture data 134 could be, for example, video data copied from a frame buffer associated with the server computing device 100 and generated by the software application 110 in response to the input data 136.

With this configuration, the software application 110 acts as a hosted application, and the end-user may interact with that hosted application remotely via the application console 130. The application console 130 may repeatedly transmit the input data 136 to the software application 110 in response to input received from the end-user, receive the capture stream 116 from the server computing device 100 in response to that input data 136, then display the capture data 134 derived from that capture stream 116 to the end-user. In one embodiment, the application console 130 may be a web browser coupled to the server computing device 100 across the Internet, or a web application designed specifically for interacting with the software application 110.

The application console 130 receives input from the end-user, such as mouse clicks, keyboard key strokes, or audio from the I/O devices 124. The application console 130 transfers the end-user input to the software application 110 within the input data 136. The application console 130 also adds timestamps that synchronize the different data within the input data 136. The application console 130 may also include files, such as video, audio, or image files in the input data 136. The input data 136 may also include voice audio data from the end-user. The voice audio data may be the end-user describing the execution of the software application 110. The files may be located within the memory unit 126. The application console 130 may send the input data 136 as the included data becomes available or the input data 136 may be buffered. For instance, if the application console 130 is unable to transfer the input data 136 to the software application 110 because of a network error, then the application console 130 could buffer the input data 136. In such a case, the execution of the software application 110 could pause until the software application 110 receives the buffered input data 136. The application console 130 may send the input data 136 using a transfer protocol, such as hypertext transfer protocol (HTTP or HTTPS).

The software application 110 is configured to receive the input data 136 from the application console 130. The software application 110 may immediately process the input data 136 upon receipt, or buffer the input data 136. For instance, the software application 110 could buffer metadata instructions associated with a file, until the software application 110 receives the file in the input data 136. In response to the input data 136, the software application 110 generates output, such as video or audio output. The output may be stored in buffers within the memory unit 106. For instance, the video output could be stored as pixel data within a frame buffer. The software application 110 may be capable of producing intentionally different versions of the output, such as video output internationalized to different languages.

In practice, the software application 110 may be a 3D modeling application running on a server that allows the end-user to create and edit 3D models, although any type of software application also falls within the scope of the present invention. When software application 110 represents a 3D modeling application, mouse location and click metadata within the input data 136 instructs the software application 110 to pan and zoom a 3D model. The input data 136 also may include an image file that end-user input instructs the software application 110 to apply to the 3D model as a texture map. The video output showing the execution of these operations by the software application 110 is sent to the client computing device 120 in the capture stream 116 and then displayed to the end-user.

The capture engine 112 generates the capture stream 116 to include at least a portion of the output from the software application 110 for display to the end-user by the application console 130 of the client computing device 120. The capture stream 116 may, for instance, include video output from the software application 110. In such a case, the capture stream 116 may include the entire video output, a portion of each frame of the video output, a portion of the video output at a particular video frame rate, or some combination thereof. The capture stream 116 may include timestamps for each frame of video output, and additional output, such as audio data, synchronized to the frames of the video output.

The application console 130 outputs data received in the capture stream 116 as the capture data 134. The application console 130 may output the capture data 134 through the I/O devices 124, store the capture data 134, or some combination thereof. For instance, if the capture stream 116 were to include video output from the software application 110, then the application console 130 would include the video output within the capture data 134. In such as case, the application console 130 could display the capture data 134 within an application window, within a web browser window, or across the entire screen of a display device included in the I/O devices 124. The application console 130 may include all or a portion of the video output received in the capture data 134. If the application console 130 immediately transmits the input data 136 in response to input from the end-user and immediately displays the capture data 134 as the capture stream 116 is received, then the application console 130 may provide an end-user experience that mimics actually running the software application 110 on the client computing device 120.

The capture engine 112 generates the capture stream 116 based on output from the software application 110, as mentioned above. In one embodiment, the capture engine 112 performs a capturing operation, then a streaming application actually generates and transmits capture stream 116 to the client computing device 120. The capture engine 112 may continuously transmit or stream the capture stream 116 to the application console 130 or the capture engine 112 may buffer the capture stream 116. The capture engine 112 may transmit the capture stream 116 using a transfer protocol, such as the well-known user datagram protocol (UDP).

The capture engine 112 is also configured to generate the capture data 114 based on at least a portion of the output from the software application 110. For instance, the capture engine 112 could store the video output from the software application 110 as the capture data 114. The capture engine 112 may store multiple types of output, such as audio and video output within the capture data 114. The capture engine 112 may include timestamps that synchronize the different outputs stored within the capture data 114. If the software application 110 is capable of producing multiple versions of a particular output, then the capture engine 112 may store one or more versions of the output. In addition to output, the capture engine 112 may also store some or all of the input data 136. As described, the input data 136 may include metadata generated by input from the end-user, including voice narration audio data. Although the capture engine 112 and capture data 114 are shown within the server computing device 100, in different embodiments, the capture engine 112 and/or the capture data 114 may be stored within different servers.

The capture engine 112 may also process the capture data 114. The capture engine 112 may compress or encode the capture data 114 into different formats. For instance, the capture engine 112 could compress the video output into a well-known video file format, such as mpeg-2. The capture engine 112 may also combine a portion of the input data 136 not yet included in the capture data 114, such as voice narration audio data, with a portion of the output, such as the video output, to create, for instance, a narrated video. Likewise, the capture engine 112 may add visual enhancements to the capture data 114, such as mouse or keyboard overlays, or automatic pan and zoom effects, based on end-user generated metadata included within the input data 136.

The capture engine 112 may automatically start and stop storing the capture data 114. The capture engine 112 may start storing capture data 114 when the software application 110 starts, and stop storing capture data 114 when the software application 110 stops. The capture engine 112 may also start, stop, or pause storing capture data 114 in response to particular states of the software application 110, such as pausing when there is no change in the output of the software application 110. Likewise, the capture engine 112 may only store capture data 114 when particular operations are performed by the software application 110, such a sculpting operations with a 3D modeling application.

The capture engine 112 may also start and stop storing capture data 114 in response to instructions within the input data 136. The application console 130 may provide controls responsive to input at the I/O devices 124 to allow the end-user to send such instructions. A separate application stored within the memory unit 126 may also provide controls responsive to input at the I/O devices 124 that may notify the application console 130 to send the instructions to the capture engine 112 or may directly insert the instructions into the input data 136.

The capture engine 112 is also configured to insert data related to generation of the capture data 114 into the capture stream 116. The capture engine 112 may insert capture status information, such as the size of the current capture data 114 or the amount of processing resources consumed by the capture engine 112. The capture engine 112 may also insert a unique identifier for the capture data 114 within the capture stream 116. The unique identifier may be a hyperlink to the capture data 114, which may allow the end-user to access the capture data 114 for playback, download, or publication. The capture engine 112 may provide the unique identifier while storing the capture data 114 or after storing the capture data 114. The capture engine 112 may also provide the unique identifier to another server for publication. The capture engine 112 may also store the capture data 114 on a different server or copy the capture data 114 to the client computing device 120. For example, the capture engine 112 may publish the capture data 114 by copying the capture data 114 to a server designed to distribute the capture data 114, such as a video streaming server. The capture engine 112 may then send a hyperlink for the capture data 114 on the video streaming server to the end-user.

Although the capture data 134 and the capture data 114 may be similar or substantially similar, the capture data 114 is immediately available on the server computing device 100 for sharing or publication, as the software application 110 executes. Further, the capture engine 112 stores the capture data 114 without using processing unit 122 or memory unit 126 resources on the client computing device 120, thereby reducing the overhead associated with screen capturing publication typically required by conventional systems.

The embodiment illustrated in FIG. 1 is illustrative only and in no way limits the scope of the present invention. In other embodiments, various modifications of the features and functions of the software application 110, capture engine 112, and capture data 114 are contemplated. For example, in other embodiments, there may be multiple capture engines 112 located on the server computing device 100 or other servers. The multiple capture engines 112 may, for instance, each store a different version of the output from the software application 110. Further, the software application 110 may be the entire operating system of the server computing device 100 or an application not designed to send the capture stream 116. In such a case, the capture engine 112 or a particular data streaming application may send at least a portion of the output from the software application 110 in the capture stream 116.

Figure 2:
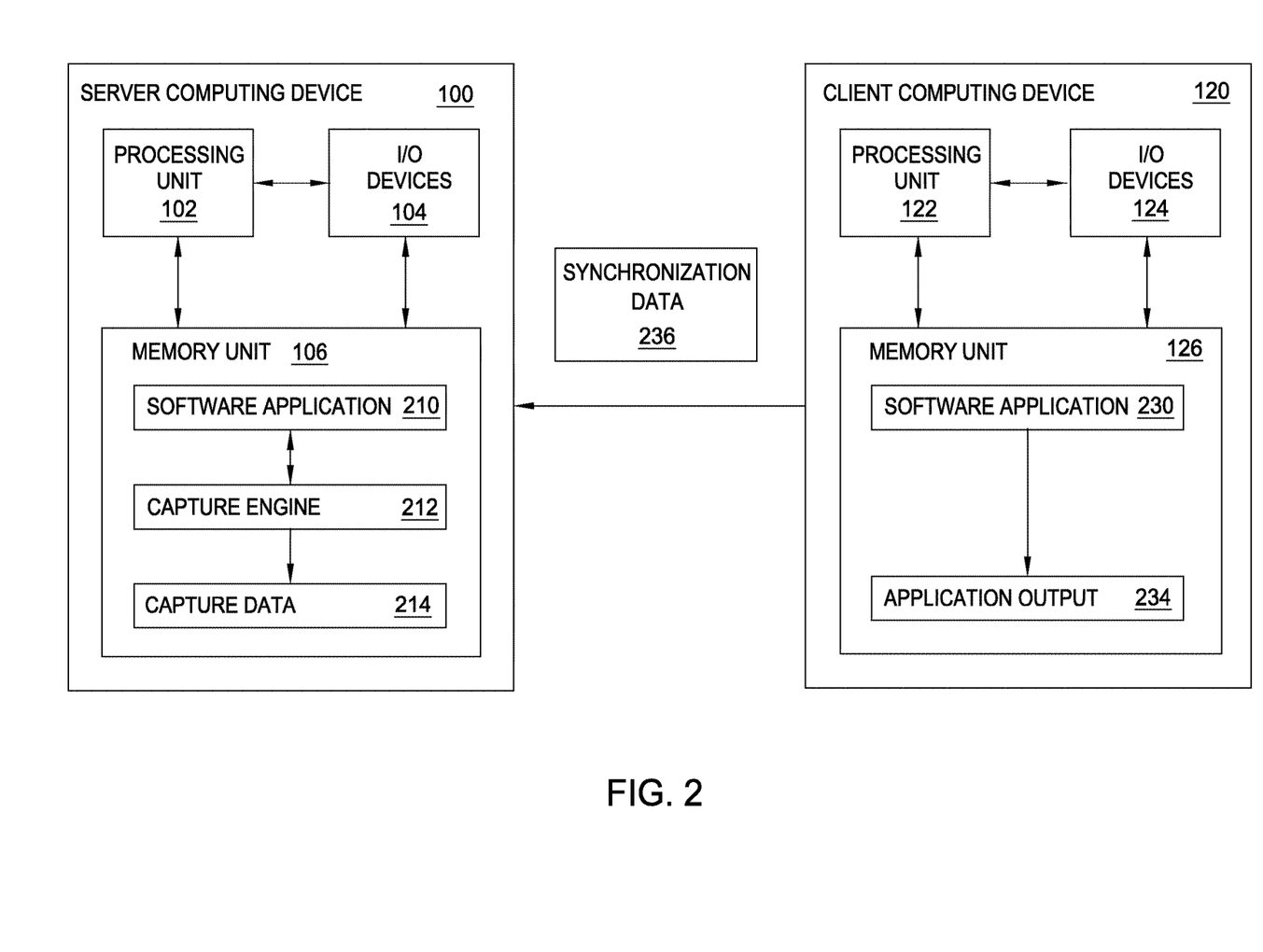
FIG. 2 illustrates the server computing device and the client computing device shown in FIG. 1, according to another embodiment of the present invention.

FIG. 2 illustrates the server computing device 100 and the client computing device 120 shown in FIG. 1, according to another embodiment of the present invention. As shown, FIG. 2 illustrates some of the same elements as shown in FIG. 1. In addition, FIG. 2 illustrates a software application 210, capture engine 212, and capture data 214 within the memory unit 106 of the server computing device 100, a software application 230 and an application output 234 within the memory unit 126 of the client computing device 120, and synchronization data 236 that is transmitted from client computing device 120 to server computing device 100.

In one embodiment, the software application 210 and the software application 230 are two copies of the same desktop software application. The software application 210 and the software application 230 are configured to operate in a substantially similar manner, so that the output produced by either the software application 210 or the software application 230 is substantially similar.

The software application 230 is configured to produce application output 234 and transmit the synchronization data 236 to the software application 210. The application output 234 may be similar to the output that the software application 110 shown in FIG. 1 generates. The application output 234 may also include video or audio data. The software application 230 may display the application output 234 to the end-user within an application window in the screen of a display device included in the I/O devices 124.

The synchronization data 236 allows the software application 210 to execute similar functions against similar data as the software application 230. The synchronization data 236 may include input from the end-user, such as mouse positions, mouse clicks, and keyboard key presses, layout parameters, or files used by the software application 230. The synchronization data 236 may also include initialization information, to allow the software application 210 to start in a manner substantially similar to the software application 230. Synchronization data 236 may also include timestamps, so that the software application 210 can process events with substantially similar timing to the software application 230. The software application 230 may send the synchronization data 236 using a transfer protocol, such as HTTP or HTTPS.

Upon receipt of the synchronization data 236, the software application 210 executes in a manner substantially similar to the software application 230. The software application 210 responds to the same input from the end-user, and operates upon the same files as the software application 230. Thus, the software application 210 is able to execute in a manner substantially similar to the software application 230 and the output produced by the software application 210 and the software application 230 are substantially similar. The substantially similar execution may occur in real-time or may be delayed. To execute in real-time the software application 230 processes the synchronization data 236 when received. However, the software application 230 may also buffer the synchronization data 236 and later process the synchronization data 236. The processing of the synchronization data 236 could be delayed if, for instance, the end-user instructs the software application 230 to open a large file. In such a case, the large file would be transferred to the software application 210 within the synchronization data 236, but such a transfer could take a significant amount of time. Therefore, the software application 210 could delay processing other portions of the synchronization data 236 until the file arrives.

The capture engine 212 is configured similarly to the capture engine 112, in that the capture engine 212 reads and stores at least a portion of the output from the software application 210. The capture engine 212 stores the output as the capture data 214. The capture engine 212 may start and stop storing capture data 214 based upon the same triggers as the capture engine 112. The capture engine 212 may also process the capture data 214 in a manner similar to the capture engine 112. In addition, if the software application 210 delays processing of the synchronization data 236, the capture engine 212 may delay storing capture data 214, so that the capture data 214 may not include the delays. Thus, the capture data 214 includes data that is substantially similar to the application output 234. As the foregoing illustrates, the capture engine 212 advantageously stores the capture data 214 without using processing unit 122 or memory unit 126 resources and the capture data 214 is immediately available on the server computing device 100.

In another embodiment, the software application 210 and the software application 230 are two copies of the same web application. As such, the software application 230 may run inside a web browser and may receive application logic data from an application logic server. The server computing device 100 may be the application logic server, or the application logic server may be located on a different server. In order for the software application 210 to execute in a substantially similar way to the software application 230, the software application 210 may run within a copy of the same web browser or may run within a virtual application viewer that mirrors the behavior of the web browser. The software application 210 may also receive the same application logic data as the software application 230. The software application 210 may receive the application logic data directly from the application logic server or may receive the application logic data within the synchronization data 236. Similarly to the first embodiment, the synchronization data 236 ensures that the software application 210 executes in a substantially similar manner to the software application 230. Thus, the capture data 214 includes data that is substantially similar to the application output 234

In yet another embodiment, the software application 210 is the back-end and the software application 230 is the front-end of an application that runs partially on the server computing systems 100 and partially on the client computing system 120. The software application 210 acting as the back-end retrieves data required for the application to run and executes a portion of the application logic. The software application 210 also transfers the results of executing the application logic and the data to the software application 230. If the application has been run before, then some application logic and data may already be available on the client computing system 120. The software application 230, acting as the front-end, renders the data and results of executing the application logic as the application output 234 for display to the end-user. The software application 230 also receives input from the end-user. The software application 230 sends the input from the end-user as the synchronization data 236. The capture engine 212 then combines the application logic and data from software application 210 with the synchronization data 236 from software application 236 to generate capture data 214 that is substantially similar to the application output 234.

In still another embodiment, the software application 210 and the software application 230 are two intentionally different versions of the same software application. For instance, the software application 210 could be configured to produce video output at a different resolution or frame rate than the software application 230. Likewise, the software application 210 could be configured to produce output internationalized to a different language than the software application 230. Although the software application 210 and the software application 230 are not identical copies of each other, the synchronization data 236 ensures that the software application 210 executes in a substantially similar manner to the software application 230. Thus, the capture data 214 may be similar, but not identical to the application output 234. As the foregoing illustrates, the capture engine 212 may advantageously store capture data 214 with an intentional difference to the application output 234 the software application 230 presents to the end-user. The end-user could then, for example, create a tutorial video of the software application 210 configured in Spanish, by controlling the software application 230 configured in English.

Figure 3:
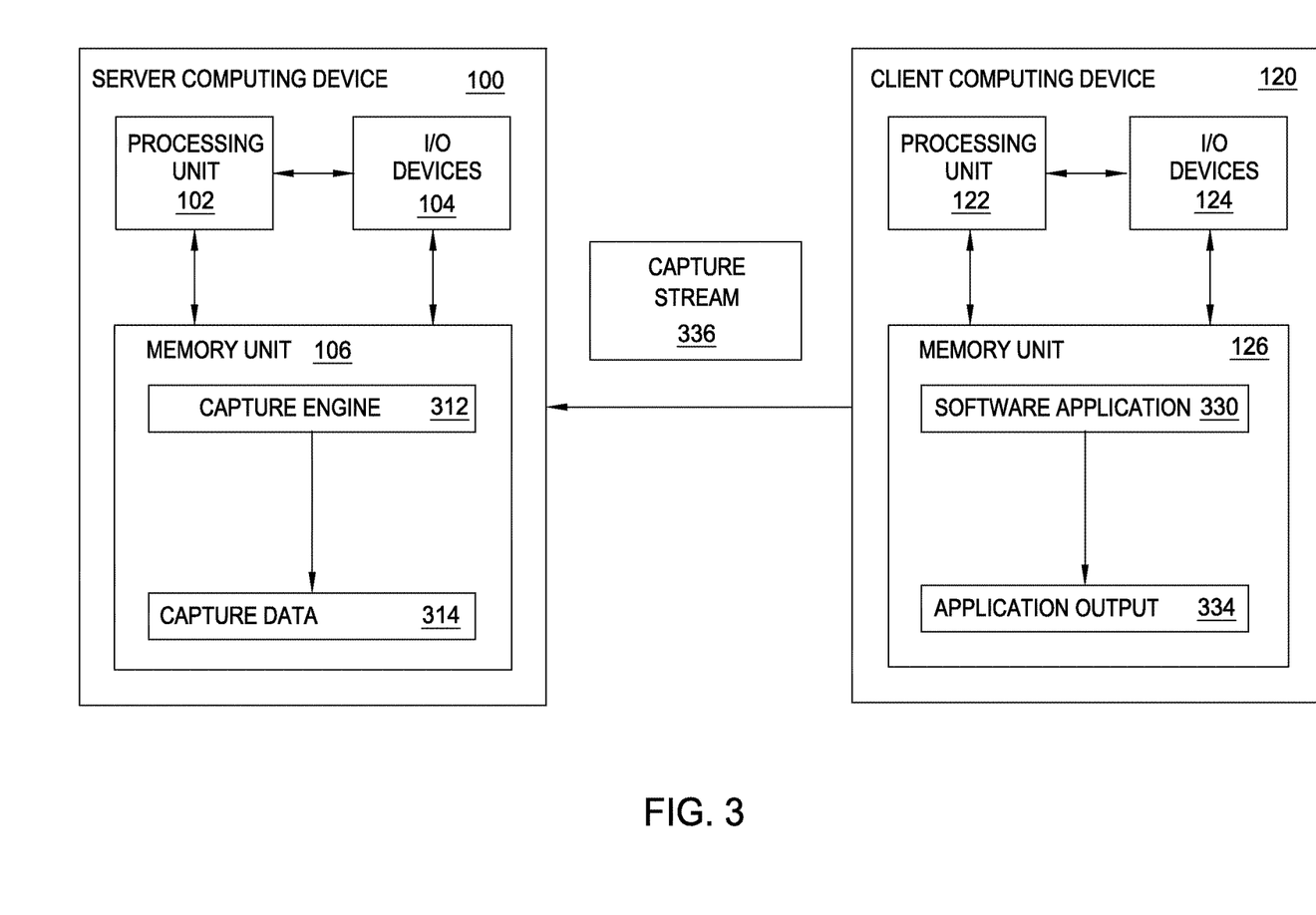
FIG. 3 illustrates the server computing device and the client computing device shown in FIGS. 1-2, according to yet another embodiment of the present invention.

FIG. 3 illustrates the server computing device 100 and the client computing device 120 shown in FIGS. 1-2, according to yet another embodiment of the present invention. As shown, FIG. 3 illustrates some of the same elements as FIG. 1 and FIG. 2. In addition, FIG. 3 illustrates a capture engine 312 and capture data 214 within the memory unit 106 of the server computing device 100, a software application 330 and application output 334 within the memory unit 126 of the client computing device 120, and a capture stream 336.

Similar to software application 230 discussed in conjunction with the various embodiments illustrated by FIG. 2, the software application 330 may be a desktop application or a web application. As such, the software application 330 is configured to produce application output 334, which is similar to the application output 234 of FIG. 2. However, the software application 330 transmits the capture stream 336 instead of the synchronization data 236 of FIG. 2. The capture stream 336 may include contents similar to the contents of the capture stream 116 discussed in conjunction with FIG. 1. Thus, the capture stream 336 includes at least a portion of the output produced by the software application 330. The capture stream 336 may, for instance, include video output from the software application 330. The software application 330 may transmit the capture stream 336 to the capture engine 312 within the server computing device 100 using a transfer protocol, such as the well-known UDP.

The capture engine 312 is configured to receive the capture stream 336 and store the data included within the capture stream 336 as the capture data 314. If the capture stream 336 includes video output from the software application 330, then the capture engine 312 stores the video output within the capture data 314. The capture engine 312 may start and stop storing capture data 214 based upon the same triggers as the capture engine 112. The capture engine 312 may also process the capture data 214 in a manner similar to the capture engine 112. As the foregoing illustrates, the capture engine 312 advantageously stores the capture data 314 without using processing unit 122 or memory unit 126 resources and the capture data 314 is immediately available on the server computing device 100.

In all the embodiments illustrated by FIGS. 1, 2, and 3, the server computing device 100 may be configured to create capture data 214 for multiple client computing devices 120 concurrently. For example, the memory unit 106 of the server computing device 100 discussed in conjunction with FIG. 1, could include multiple instances of the software application 110, capture engine 112, and capture data 114, where each instance operates in response to input data 136 received from a different client computing device 120. Alternatively, in a different embodiment, the software application 110 could operate in response to multiple instances of input data 136 from different client computing devices 120, where the end-users of the different client computing devices 120 may be collaborating.

Figure 4:
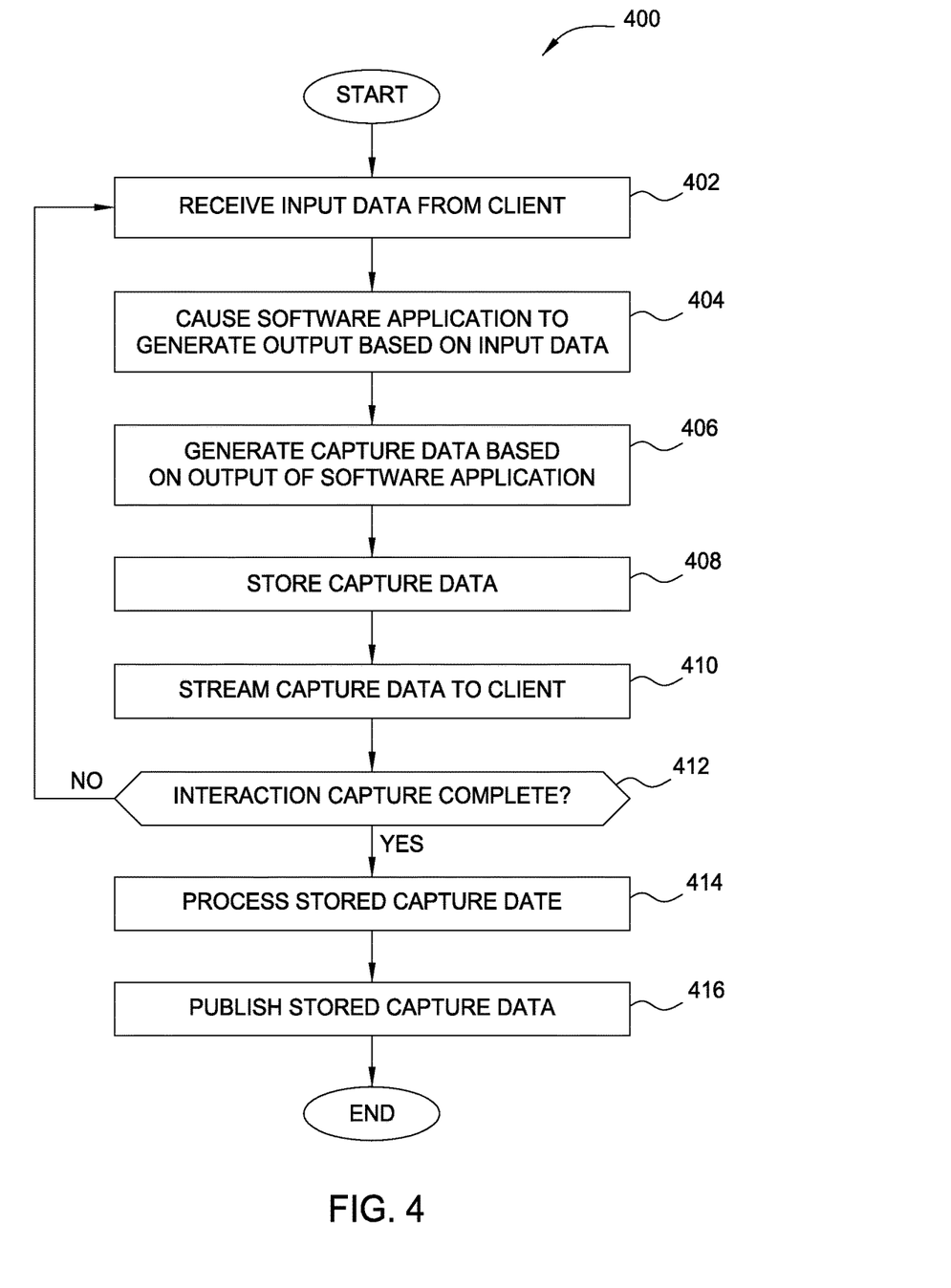
FIG. 4 illustrates a flow diagram of method steps for generating and publishing capture data based on input data received from a client computing device, according to one embodiment of the present invention.

FIG. 4 illustrates a flow diagram of method steps for generating and publishing capture data based on input data received from a client computing device, according to one embodiment of the present invention. Although the method steps are described in conjunction with the systems of FIGS. 1-3, persons skilled in the art will understand that any system configured to perform the method steps, in any order, is within the scope of the present invention.

As shown, a method 400 begins at step 402, where the software application 110 within the server computing device 100 receives input data 136 from the client computing device 120. The input data 136 may include metadata generated by input from the end-user, such as mouse locations, mouse clicks, keyboard key presses, microphone voice recording, and so forth. The input data 136 may also include files, such as video files, text files, or image files and timestamps that synchronize the different data within the input data 136. The software application 110 may receive the input data 136 using a transfer protocol, such as HTTP or HTTPS. The method 400 proceeds to step 404.

At step 404, the software application 110 generates output based on the input data 136, such as a video or audio data. The output may be stored in buffers within the memory unit 106. The method 400 proceeds to step 406.

At step 406, the capture engine 112 generates capture data 114 based on the output of the software application 110. The capture data 114 includes at least a portion of the output. The capture engine 112 may also generate a portion of the capture data 114 based on the input data 136. Thus, the capture data 114 may include video output from the software application 110 and voice narration audio data from the input data 136. The method 400 proceeds to step 408.

At step 408, the capture engine 112 stores the capture data 114 within the memory unit 106. If the capture data 114 comprises of video output, then the capture engine 112 may store the capture data 114 as a video clip. In different embodiments, the capture engine 112 may store the capture data 114 on a different server than the server computing device 100. The method 400 proceeds to step 410.

At step 410, the capture engine 112 streams at least a portion of the capture data 114 to the client computing device 120. The capture stream 116 may include video output from the software application 110 that is also stored within the capture data 114. The capture steam 116 may not include portions of the capture data 114 generated from the input data 136, such as voice narration audio data. The software application 110 may transmit the capture stream 116 using a transfer protocol, such as the well-known UDP. The method 400 proceeds to step 412.

At step 412, the capture engine 112 determines if the interaction capture is complete. The capture engine 112 may automatically determine that the interaction capture is complete if the software application 110 stops. The capture engine 112 may also determine that the interaction capture is complete in response to a particular state of the software application 110, such as the end-user exiting an edit mode within the software application 110. In addition, the capture engine 112 may determine that the interaction capture is complete in response to a particular instruction received within the input data 136. If the capture engine 112 determines the interaction capture is not complete, then the method 400 returns to step 402. Otherwise, if the capture engine 112 determines the interaction capture is complete, then the method 400 proceeds to step 414.

At step 414, the capture engine 112 processes the capture data 114. The capture engine 112 may compress or encode the capture data 114 into different formats. The capture engine 112 may also add visual enhancements to the capture data 114, such as mouse or keyboard overlays, or automatic pan and zoom effects, based upon end-user generated metadata included within the input data 136. The method 400 proceeds to step 416.

At step 416, the capture engine 112 may publish the capture date 114. The publication may involve sending a hyperlink for accessing the capture data 114 to the client computing device 120. Alternatively, the capture engine 112 may move or copy the capture data 114 to a server designed to distribute the capture data 114, such as a server designed for streaming videos. The method 400 then ends.

Figure 5:
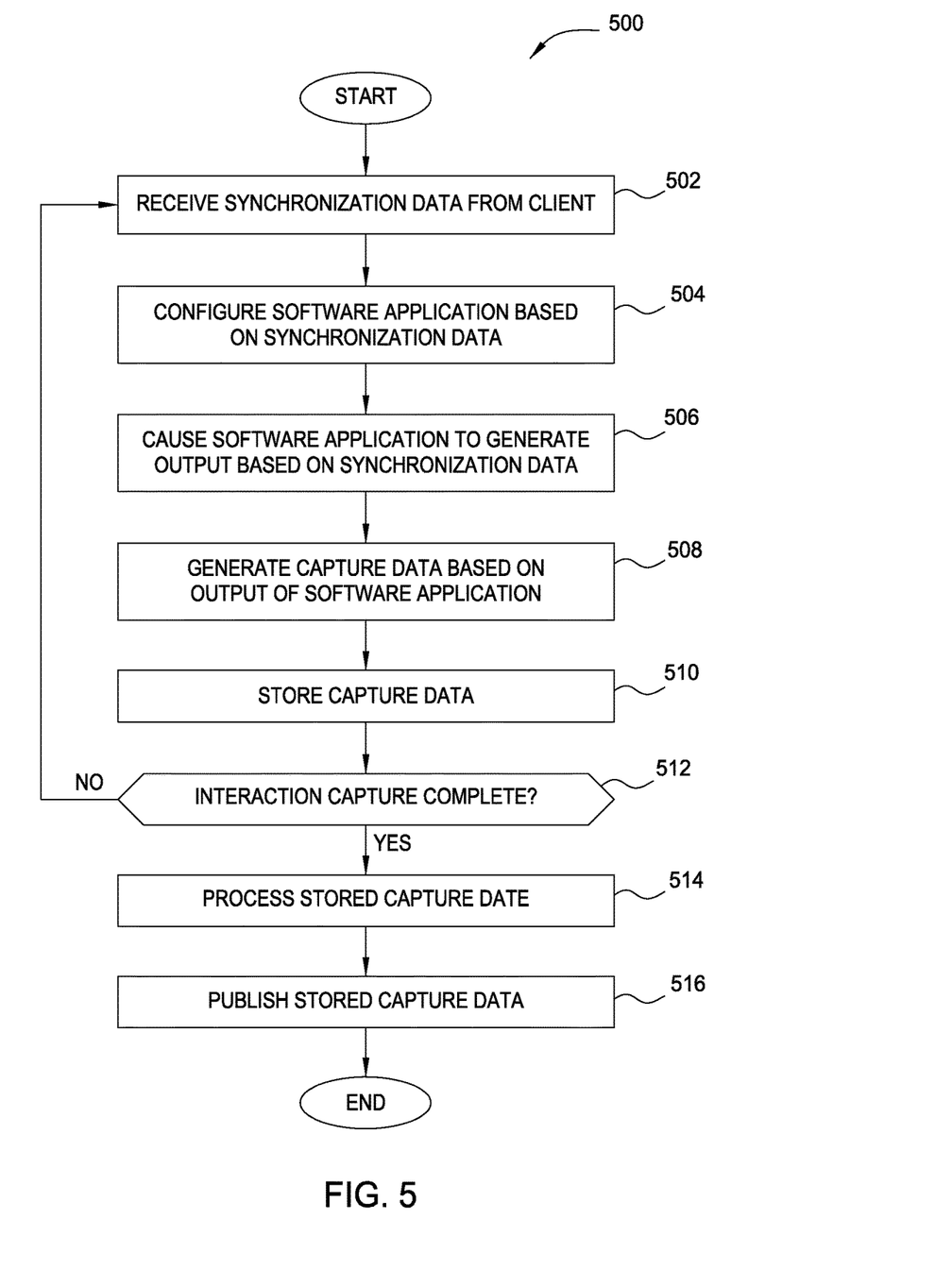
FIG. 5 illustrates a flow diagram of method steps for generating and publishing capture data based on synchronization data received from a client computing device, according to one embodiment of the present invention.

FIG. 5 illustrates a flow diagram of method steps for generating and publishing capture data based on synchronization data received from a client computing device, according to one embodiment of the present invention. Although the method steps are described in conjunction with the system of FIGS. 1-3, persons skilled in the art will understand that any system configured to perform the method steps, in any order, is within the scope of the present invention.

As shown, a method 500 begins at step 502, where the software application 210 within the server computing device 100 receives synchronization data 236 from the client computing device 120. The synchronization data 236 may include initialization information, input from the end-user, such as mouse positions, mouse clicks, and keyboard key presses, layout parameters, or files used by the software application 230. The synchronization data 236 allows the software application 210 to execute the same functions against the same data as the software application 230. The software application 210 may receive the synchronization data 236 using a transfer protocol, such as HTTP or HTTPS. The method 500 proceeds to step 504.

At step 504, the software application 210 performs a configuration routine based on the synchronization data 236, thereby causing the software application 210 to be configured similarly to the software application 230. The synchronization data 236 includes initialization information, to ensure that the software application 210 configures itself in a manner substantially similar to the software application 230. The substantially similar configuration prepares the software application 210 to generate output substantially similar to the output of the software application 230. The method 500 proceeds to step 506.

At step 506, the execution of the software application 210 based on the synchronization data 236 causes the software application 210 to generate output. The synchronization data 236 enables the software application 210 to execute in a manner substantially similar to the execution of the software application 230. The substantially similar execution may occur in real-time or may be delayed. To execute in real-time the software application 230 processes the synchronization data 236 when received. However, the software application 230 may also buffer the synchronization data 236 and process the synchronization data 236 later. Whether the execution of the software application 210 based on the synchronization data 236 is in real-time or delayed, the output of the software application 210 is substantially similar to the output generated by software application 230. The method 500 proceeds to step 508.

At step 508, the capture engine 212 generates capture data 214 based on the output of the software application 210. The capture data 214 includes at least a portion of the output. The method 500 proceeds to step 510.

At step 510, the capture engine 212 stores the capture data 214 within the memory unit 106. If the capture data 214 comprises of video output, then the capture engine 212 may store the capture data 214 as a video clip. In different embodiments, the capture engine 212 may store the capture data 214 on a different server than the server computing device 100. The method 500 proceeds to step 512.

At step 512, the capture engine 212 determines if the interaction capture is complete. The capture engine 212 may automatically determine that the interaction capture is complete if the software application 210 stops or the synchronization data 236 includes a particular instruction to stop the software application 210 or the interaction capture. The capture engine 212 may also determine that the interaction capture is complete in response to a particular state of the software application 210. If the capture engine 212 determines the interaction capture is not complete, then the method 500 returns to step 502. Otherwise, if the capture engine 212 determines the interaction capture is complete, then the method 500 proceeds to step 514.

At step 514, the capture engine 212 processes the capture data 214. The capture engine 212 could compress or encode the capture data 214 into different formats. The method 500 proceeds to step 516.

At step 516, the capture engine 212 may publish the capture data 214. The publication may involve sending a hyperlink for accessing the capture data 214 to the client computing device 120. Alternatively, the capture engine 212 may move or copy the capture data 214 to a server designed to distribute the capture data 214, such as a server designed for streaming videos. The method 500 then ends.

Figure 6A:
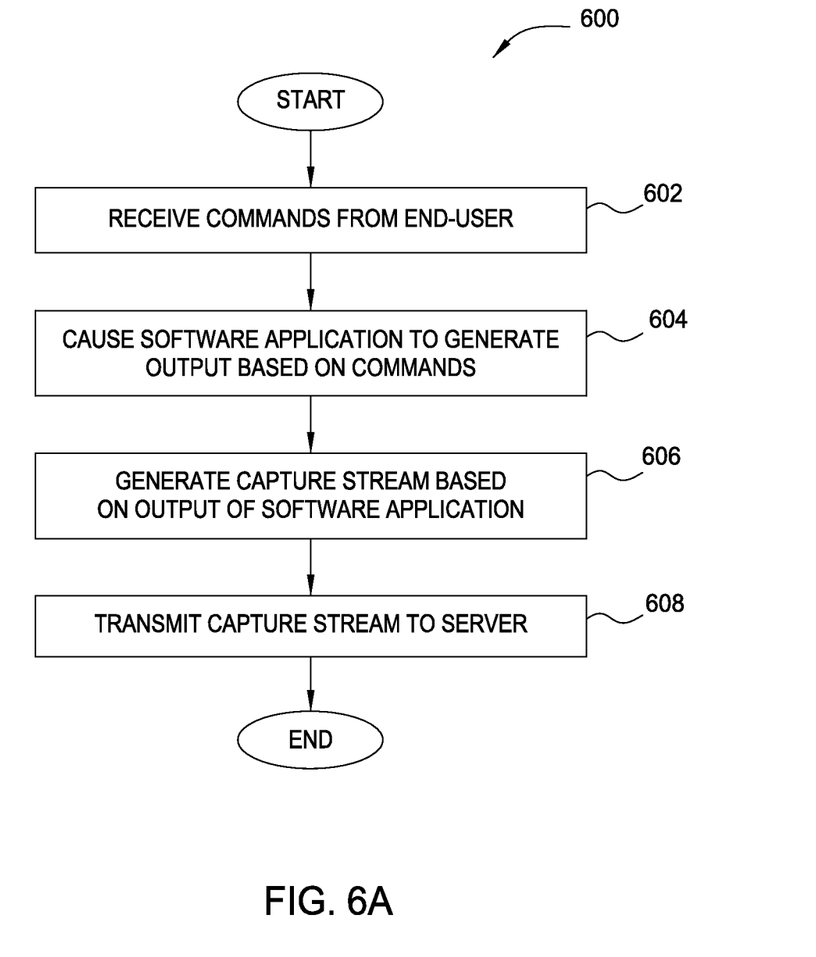
FIG. 6A illustrates a flow diagram of method steps for generating capture data, according to one embodiment of the present invention.

FIG. 6A illustrates a flow diagram of method steps for generating capture data, according to one embodiment of the present invention. Although the method steps are described in conjunction with the system of FIGS. 1-3, persons skilled in the art will understand that any system configured to perform the method steps, in any order, is within the scope of the present invention.

As shown, a method 600 begins at step 602, where the software application 330 within the server computing device 100 receives commands from the end-user. The commands may include mouse clicks, keyboard key presses, or audio from the I/O devices 124. The method 600 proceeds to step 604.

At step 604, the execution of the software application 330 based on the commands from the end-user causes the software application 330 to generate output, such as a video or audio output. The output may be stored in buffers within the memory unit 106. The method 600 proceeds to step 606.

At step 606, the software application 330 generates the capture stream 336 based on the output. The capture stream 336 includes at least a portion of the output of the software application 330, such as video output. The method 600 proceeds to step 608.

At step 608, the software application 330 transmits the capture stream 336 to the server computing device 100. The software application 330 may transmit the capture stream 336 using a transfer protocol, such as the well-known UDP. The method 600 then ends.

Figure 6B:
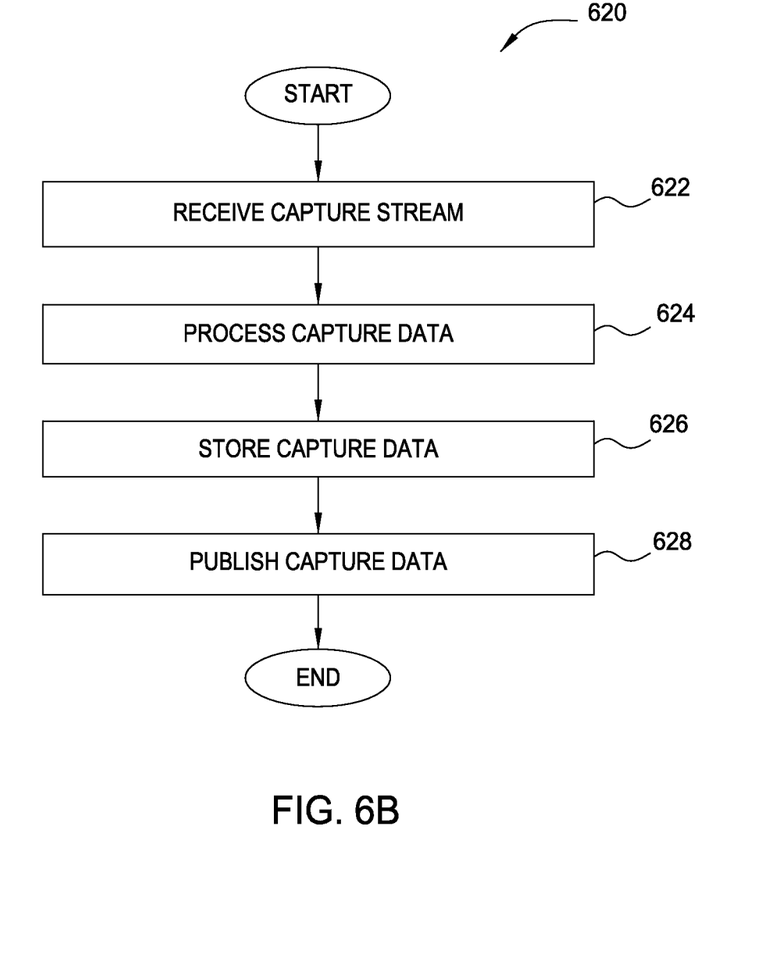
FIG. 6B illustrates a flow diagram of method steps for publishing capture data, according to one embodiment of the present invention.

FIG. 6B illustrates a flow diagram of method steps for publishing capture data, according to another embodiment of the present invention. Although the method steps are described in conjunction with the system of FIGS. 1-3, persons skilled in the art will understand that any system configured to perform the method steps, in any order, is within the scope of the present invention.

As shown, a method 620 begins at step 622, where the capture engine 312 within the server computing device 100 receives the capture stream 336. As discussed, the capture stream 336 includes at least a portion of the output of the software application 330, the output is the capture data 314. The method 620 proceeds to step 624.

At step 624, the capture engine 312 processes the capture data 314. The capture engine 312 may compress or encode the capture data 314 into different formats. If the capture data 314 includes video data, then the capture engine 312 may add visual enhancements to the video data, such as mouse or keyboard overlays, or automatic pan and zoom effects. The method 620 proceeds to step 626.

At step 626, the capture engine 312 stores the capture data 314 within the memory unit 106. If the capture data 314 includes video data, then the capture engine 312 may store the capture data 314 as a video clip. In different embodiments, the capture engine 312 may store the capture data 314 on a different server than the server computing device 100. The method 620 proceeds to step 628.

At step 628, the capture engine 312 may publish the capture data 314. The publication may involve sending a hyperlink for accessing the capture data 314 to the client computing device 120. Alternatively, the capture engine 312 may move or copy the capture data 314 to a server designed to distribute the capture data 314, such as a server designed for streaming videos. The method 620 then ends.

In sum, the techniques disclosed above provide a variety of server and client computer configurations for capturing output generated by a software application controlled by an end-user of the client computer, where a capture engine running on the server computer captures the data. The data may be captured from a hosted application running on the server computer, an application simulating the operations of an application used by the end-user on the client computer, or from a capture stream sent by an application on the client computer.

Advantageously, the capture engine stores the capture data without consuming processing or memory resources of the client computer. Furthermore, the capture data is immediately available on the server computer for sharing and publication, without consuming network bandwidth or a long upload delay.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A computer-implemented method for publishing information that reflects the operation of a software application, the method comprising:
   receiving input data comprising synchronization data from a first software application executing on a first computing device, wherein the synchronization data includes timestamps that enable a second software application to process events with substantially similar timing to the first software application, and the first software application and the second software application comprise different versions of a given software application;

causing the second software application executing on a second computing device to generate output data in response to the input data and in accordance with the timestamps;

generating a capture sequence that includes at least a portion of the output data and at least a portion of the input data, and reflects the operation of the second software application; and publishing the capture sequence for access via a network.

2. The computer-implemented method of claim 1, further comprising, in response to receiving the input data, transmitting the output data to the first computing device for display to an end-user.

3. The computer-implemented method of claim 1, wherein the input data includes one or more commands issued to the second software application by an end-user via the first software application.

4. The computer-implemented method of claim 3, wherein the input data includes an audio narrative provided by the end-user and recorded by the first software application.

5. The computer-implemented method of claim 1, wherein generating the capture sequence comprises combining a portion of the output data with a portion of the input data.

6. The computer-implemented method of claim 1, wherein the output data comprises video data, and generating the capture sequence comprises copying one or more video frames included in the output data from a memory unit associated with the second computing device.

7. The computer-implemented method of claim 1, wherein the first software application comprises a web browser configured to access the second computing device via a network connection.

8. The computer-implemented method of claim 1, wherein the second software application comprises a computer-aided design (CAD) application that is hosted by the second computing device and accessible via the network.

9. A non-transitory computer-readable medium including instructions that, when executed by a processing unit, cause the processing unit to publish information that reflects the operation of a software application, by performing the steps of:

receiving input data comprising synchronization data from a first software application executing on a first computing device, wherein the synchronization data includes timestamps that enable a second software application to process events with substantially similar timing to the first software application, and the first software application and the second software application comprise different versions of a given software application;

causing the second software application executing on a second computing device to generate output data in response to the input data and in accordance with the timestamps;

generating a capture sequence that includes at least a portion of the output data and at least a portion of the input data, and reflects the operation of the second software application; and publishing the capture sequence for access via a network.

10. The computer-readable medium of claim 9, further comprising, in response to receiving the input data, transmitting the output data to the first computing device for display to an end-user.

11. The computer-readable medium of claim 9, wherein the input data includes one or more commands issued to the second software application by an end-user via the first software application.

12. The computer-readable medium of claim 11, wherein the input data includes an audio narrative provided by the end-user and recorded by the first software application.

13. The computer-readable medium of claim 9, wherein generating the capture sequence comprises combining a portion of the output data with a portion of the input data.

14. The computer-readable medium of claim 9, wherein the output data comprises video data, and generating the capture sequence comprises copying one or more video frames included in the output data from a memory unit associated with the second computing device.

15. The computer-readable medium of claim 9, wherein the first software application comprises a web browser configured to access the second computing device via a network connection.

16. The computer-readable medium of claim 9, wherein the second software application comprises a computer-aided design (CAD) application that is hosted by the second computing device and accessible via the network.

17. A system, comprising:

a first computing device having a processing unit configured to:

receive input data comprising synchronization data from a first software application executing on a second computing device, wherein the synchronization data includes timestamps that enable a second software application to process events with substantially similar timing to the first software application, and the first software application and the second software application comprise different versions of a given software application;

cause the second software application executing on the first computing device to generate output data in response to the input data and in accordance with the timestamps;

generate a capture sequence that includes at least a portion of the output data and at least a portion of the input data, and reflects the operation of the second software; and publish the capture sequence for access via a network.

18. The system of claim 17, wherein the first computing device further comprises a memory coupled to the processing unit and including instructions that, when executed by the processing unit, cause the processing unit to receive, cause, generate, and publish.

19. The system of claim 17, further comprising the second computing device configured to execute the first software application.

20. The system of claim 17, wherein the first software application comprises a web browser configured to access the first computing device via a network connection, and the second software application comprises a computer-aided design (CAD) application that is hosted by the first computing device and accessible via the network.

21. The computer-implemented method of claim 1, wherein the synchronization data further includes initialization information that allows the second software application to start in a manner substantially similar to the first software application.

* * * * *